United States Patent [19]

Jones

[11] Patent Number: 4,844,113
[45] Date of Patent: Jul. 4, 1989

[54] FLUID FLOW SAFETY VALVE

[76] Inventor: Cecil R. Jones, 21127 Bank Mill Rd., Saratoga, Calif. 95070

[21] Appl. No.: 169,280

[22] Filed: Mar. 17, 1988

[51] Int. Cl.[4] .............................................. F16K 17/36
[52] U.S. Cl. ...................................... 137/39; 137/80; 137/460; 137/499; 251/65
[58] Field of Search ................ 137/38, 39, 45, 79, 137/80, 460, 499; 251/65

[56] References Cited

U.S. PATENT DOCUMENTS

| 2,615,460 | 10/1952 | Crow | 137/38 |
| 2,821,995 | 2/1958 | Semler | 137/460 |
| 3,495,620 | 2/1970 | Raimondi | 251/65 X |
| 3,768,497 | 10/1973 | Mueller | 137/38 |
| 3,805,818 | 4/1974 | Yamada | 137/38 |
| 4,382,449 | 5/1983 | Nelson | 137/38 |
| 4,603,591 | 8/1986 | Sibley | 137/38 |
| 4,658,846 | 4/1987 | Johnson | 137/460 X |

FOREIGN PATENT DOCUMENTS 58451  8/1982  European Pat. Off. ............. 137/79

Primary Examiner—Robert G. Nilson

[57] ABSTRACT

An automatic shut-off safety valve comprising a movable poppet held in a stable position by magnets and a movable weight. On the occurrence of an abnormal condition, such as a seismic event, the movable weight is displaced and gravity carries the poppet downward until it engages a valve seat, closing off fluid flow. Magnets may also be used to hold the poppet in its closed position. Modifications include using the fluid flow itself to assist in displacing the poppet from its stable position.

19 Claims, 3 Drawing Sheets

FLUID FLOW SAFETY VALVE

This invention relates to safety valves for automatically shutting-off fluid flow in response to an abnormal condition.

BACKGROUND OF THE INVENTION

One of the principal causes of loss of life and property damage following the occurrence of an earthquake or other seismic disturbance is fire. Fires are often started by gas line failures. There is a need in the art for a safety valve that can be located in the gas line feeding a residence and that is capable of automatically shutting-off the gas flow in response to vibration above some predetermined limit, as may be caused by a severe earthquake.

Safety valves capable of stopping fluid flow which exceeds a predetermined valve, which may be caused by a pipe failure or substantial leak, will also be useful in environments in which a pipe carries precious or dangerous materials, such as oil or radioactive fluids.

There are also applications in which it would be desirable or necessary to shut-off fluid flow when the temperature or other ambient or local condition exceeds a predetermined valve.

BRIEF DESCRIPTION OF INVENTION

An object of the invention is an automatic safety valve capable of shutting-off fluid flow in response to an abnormal condition.

Another object of the invention is an automatic safety valve capable of shutting-off fluid flow whenever one or a combination of conditions such as vibration, flow rate, temperature, or pressure exceeds a predetermined value.

Further objects of the invention include an automatic shut-off safety valve that is reliable, that will positively respond to an abnormal or unsafe condition, that will not restrict the fluid flow in the absence of the abnormal or unsafe condition, that will positively maintain the valve in a closed position when activated, and that is reasonably simple and inexpensive to manufacture.

These and other objects and advantages of the invention as will appear hereinafter are achieved, briefly speaking, with a valve construction comprising a fluid inlet and outlet on opposite sides of a valve seat, and mounted above the fluid flow is a movable poppet. The poppet is held in a first stable position by non-mechanical means, preferably by magnets. The poppet will be displaced from its first stable position to a second non-stable position when the abnormal condition occurs. Once displaced to its second non-stable position, means are provided to drive the poppet to a third stable position wherein it mates with the valve seat and shuts-off fluid flow through the valve.

In a preferred embodiment adapted to respond to one or more or a variety of conditions, the valve comprises a metal ball which upon being displaced rolls onto the poppet to a position such that its weight displaces the poppet from its first stable position and the weight of the ball drives the poppet downward until it engages the valve seat.

In another preferred embodiment, a vane or other shaped body is suspended from the poppet such that the vane extends into the fluid flow path through the seat. The fluid flow causes a drag force to be exerted tending to displace the poppet from its first stable position. Under normal conditions, the drag force is not sufficient to cause the poppet to break away from its first stable position. But when the flow increases to an unsafe or abnormal valve, the increased drag overcomes the force maintaining the poppet in its first position, and once displaced the weight of the poppet plus the drag force drives the poppet into engagement with the valve seat shutting-off the fluid flow.

As mentioned, it is preferred to use magnets to maintain the poppet in its first stable position. It is also preferred to use the same or different magnets to hold the ball against the poppet during its transition from its first to its third position, and to hold the poppet against the valve seat after it engages the latter.

DESCRIPTION OF DRAWINGS

Several exemplary embodiments of the invention will now be described in greater detail with reference to the accompanying drawings, wherein.

DETAILED DESCRIPTION OF PREFERRED EMBODIMENTS

Figure 1:
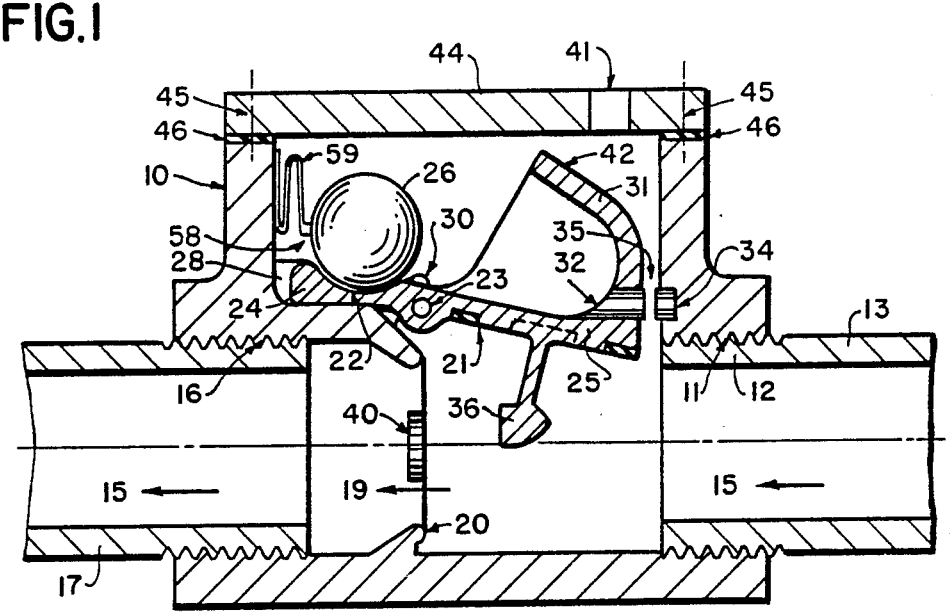
FIG. 1 is a cross-sectional view of one form of safety valve in accordance with the invention in its open position, that is, before the abnormal condition has occurred.

FIG. 1 shows in cross-section one form of safety valve in accordance with the invention that is capable of shutting-off fluid flow in response t the occurrence of one or a combination of three abnormal conditions; namely, temperature, vibration, or flow rate exceeding a predetermined value. The valve comprises a valve body 10, typically of metal, having at its right, lower side a conventional threaded female fitting 11 for receiving a threaded male end 12 of a feed pipe 13 supplying, for example, natural gas to a residence in the flow direction indicated by arrows 15.

At the opposite, left, lower side of the body and in-line with the fitting 11 is a like fiting 16 connected in turn to a pipe 17 which may enter the residence to be supplied with the natural gas. The right fitting 11 is the valve fluid inlet, and the left fitting 16 is the fluid outlet. Located in the fluid flow path 19 from inlet 11 to outlet 16 is a circular valve seat 20.

Located above and outside of the flow path 19 is a valve poppet 21. The poppet 21 comprises a straight rigid part pivotable approximately at its center by a pivot pin 23 whose ends are mounted in the front and rear walls of the valve body 10. That poppet 21 comprises a ball-holding portion 24 extending to the left of the pivot 23, and a ball-receiving portion 25 extending to the right of the pivot 23. The ball-holding portion 24 comprises a shallow concave portion 22 in which a metal sphere or ball 26, for example, of steel, seats. The poppet ball-holding portion 24 extends within a slot (not shown) formed between opposite body extensions 28 extending alongside the ball-holding portion 24. Only the rear extension 28 is shown in FIG. 1. A front extension parallel to the extension 28 is not shown. Both extensions 28 have at their rightmost distal end an upwardly extending ridge 30 which, under normal conditions, contains the ball 26 in its concave seat 22 in the valve position shown in FIG. 1. The poppet ball-receiving portion 25 comprises a generally cylindrical or sphere-shaped portion 31, which is configured to receive and hold the ball 26, should it be displaced to the right from its position shown in FIG. 1.

Mounted in the end of poppet portion 25 closest to the right valve body wall 10 is a first permanent magnet 32. Mounted in the valve body 10 opposite the first magnet 32 is a second permanent magnet 34. The latter is oppositely poled to that of the magnet 32, with the result that an attractive magnetic field is established in a relatively narrow gap 35 between the poppet first magnet 32 and the body second magnet 34. The magnet strength of the two magnets 32, 34 and the gap length 35 is chosen such that the poppet 21 is maintained in its open position shown in FIG. 1 by the attractive magnetic field despite the gravity force tending to rotate the poppet 25 downward in a clockwise (CW) direction. The weight of the ball 26 on the poppet-holding portion 24 to the left of the pivot 23 also contributes to maintaining the poppet 21 in the open position as illustrated in FIG. 1.

Suspended from the bottom of the poppet 21 is a vane shaped member 36 which extends downward into the flow path 19 of the fluid flow. The shape of vane 36 is chosen to create a drag force on the poppet 21 which tends to rotate it CW. This drag force (see, for instance, "Airplane Aerodynamics", Dommasch et al, Pitman Publishing Corp., 1951, Ch. 6, pgs. 146–154) depends upon the shape of the vane 36 and is readily adjusted over a wide range of values by changing the vane shape while taking into account the other forces exerted on the poppet, which include the poppet weight/balance, the strength of the magnetic field produced by the magnet 32, 34 and the length of the gap 35. The objective is that, under normal flow conditions, with the ball 26 positioned as shown in FIG. 1, the magnetic strength maintaining the poppet 21 in the position shown in FIG. 1, together with the ball weight, substantially exceeds the forces tending to rotate CW the poppet exerted by the weight distribution of the poppet and the drag force due to the vane 36 in the fluid flow path, with the result that the poppet remains in a first stable open position depicted in FIG. 1, in which there is no significant obstruction to the flow through the valve between inlet and outlet with the exception of the minor effect due to the vane 36.

Figure 2:
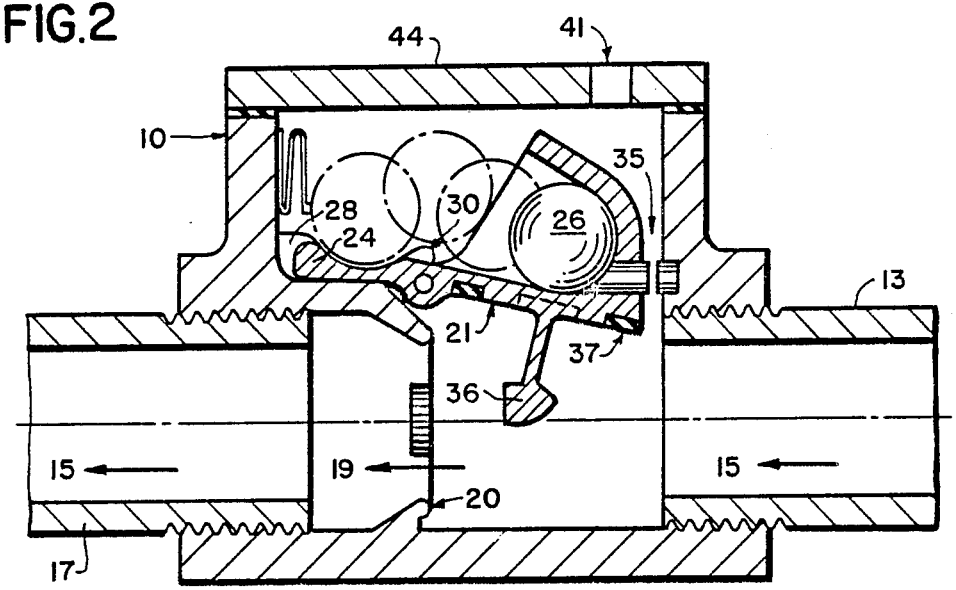
FIG. 2 is a view similar to FIG. 1 showing the effect of occurrence of the abnormal condition.

Now, several events can occur. Suppose that a seismic disturbance occurs, which causes the valve to vibrate. All easthquakes have at least two components of motion, and may have as much as six. There is always a horizontal motion and usually a vertical motion included. The ball 26 is free to move. Should any significant horizontal vibration occur, the ball 26 will move, and if the vibration is sufficient, which is determined by the height of the ridge 30, the ball 26, which can only move laterally to the right, will be displaced over the ridge 30 and roll as shown in FIG. 2 into the poppet ball-receiving portion 25 where it is held. It will also be apparent that adjusting the size and/or weight of the ball 26 relative to the height of the ridge 30 will determine how extensive a vibration is required before the ball is displaced over the ridge 30 and is caused to roll into and be held by the portion 31 of the poppet.

So far I have described how the valve displaces the ball 26 in response to vibration. Also illustrated is a way of displacing ball 26 in response to excessive temperature. Reference numeral 59 designates a conventional bi-metallic strip mounted on the body 10, which as is well known due to differential thermal expansion coefficients will expand in response to temperature increases. It is also well known how to calculate the movement of the free distal end 58 of the shaped bi-metallic strip 40 as the temperature varies. The configuration of the strip 40 can be chosen such that, when a predetermined temperature is reached, the free end 58 of the bi-metallic strip 40 is displaced sufficiently to the right of FIG. 1 so as to push the ball 26 over the ridge 30 causing the ball 26, as depicted in FIG. 2, to roll downward into and be captured by ball-holding portion 31.

So far I have described several ways to move the ball 26 from its first stable position depicted in FIG. 1, over the ridge 30 and pivot 23 and into ball-receiving portion 31. It will be evident to those skilled in this art that other means responsive to an ambient condition change can be used to move the ball into the position shown in FIG. 2. For example, pressure-responsive means can be provided in place of or in addition to the temperature-responsive means 40. For instance, which is not shown, the bi-metallic strip 40 can be replaced with, or augmented with, a flexible reference volume located between the ball 26 and the valve body 10 to its left. When the external pressure increases beyond some desired valve, the reference volume will expand pushing the ball to the right of FIG. 1 over the ridge 30 and into the poppet ball-receiving portion 31.

Figure 3:
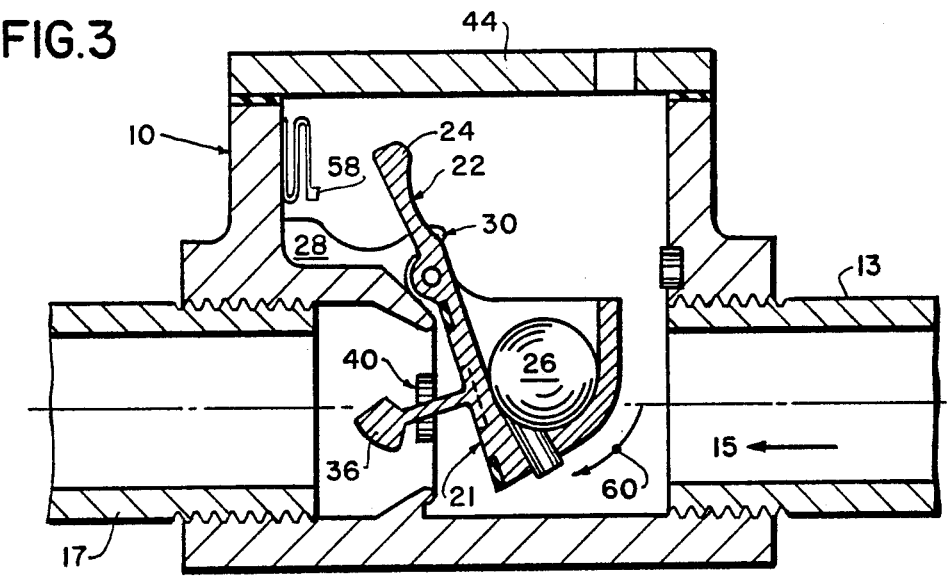
FIG. 3 is a view similar to FIG. 2 showing the poppet being displaced toward the valve seat, which follows in time the situation depicted in FIG. 2.

As mentioned the parameters are chosen such that, when the ball 26 rolls over the ridge 30 as shown in FIG. 2 and falls into the right-hand portion 31 of poppet 21, which is facilitated by the downward slanting of poppet portion 25, the additional weight of the ball 26 to the right of the pivot 23 is sufficient to overcome the magnetic forces with the result that the poppet breaks away from the magnet 34 and enters a non-stable second position by pivoting downward into the fluid flow path 15. This is depicted in FIG. 3. The weight of the ball 26 then drives the poppet 21 esentially 90 degrees until it achieves a final third stable position in which it engages and seats on the valve seat 20. This CW rotation denoted by arrow 60 in FIG. 3 due to the CW torque resulting from the ball weight 26 causes the poppet 21 to make a firm sealing contact with the valve seat 20. To assist in maintaining a firm contact and an effective seal, the poppet 21 is provided at 37 with a recessed annular gasket insert positioned to contact the seat 20 and effectively seal off the fluid flow.

Figure 4:
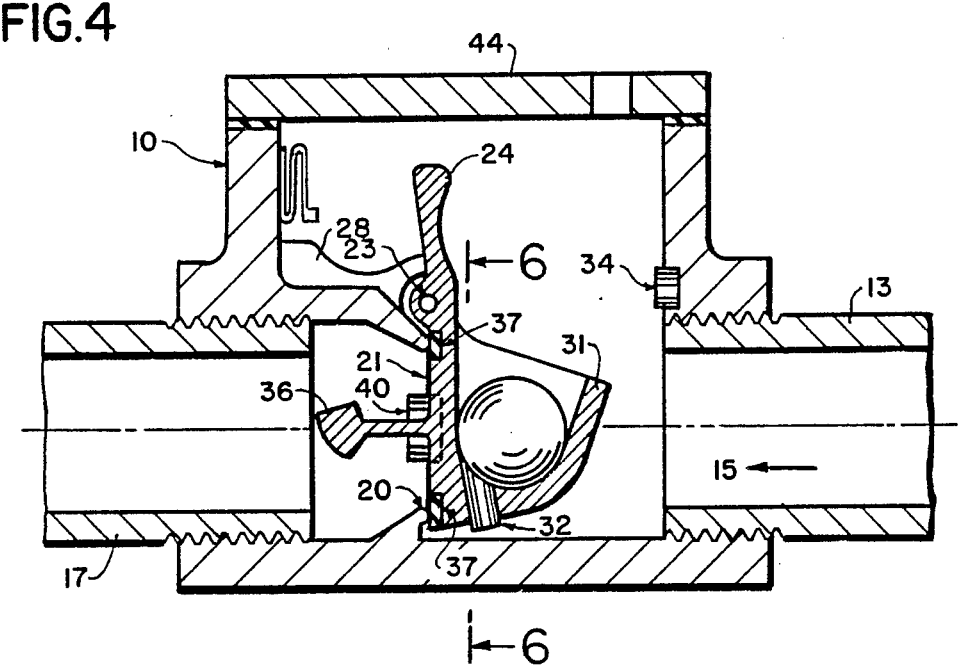
FIG. 4 is another view in the sequence showing the poppet fully displaced to its seat-engaging closed position.
Figure 6:
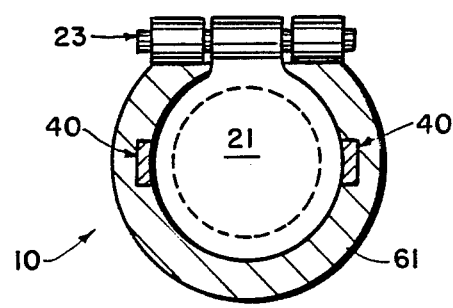
FIG. 6 is a cross-sectional view along the line 6-6 of FIG. 4 illustrating the location of poppet-holding magnets when the latter is in its closed position.

The poppet 21, as mentioned, is a straight rigid member pivoted 23 at roughly slightly left of its center. As will be noted, the poppet 21 is maintained in the position shown in FIG. 1 by a combination of forces. The ball 26 acts as a weight preventing CW rotation of the poppet 21. In addition, in the preferred embodiment, non-mechanical, magnetic forces are relied on to help maintain the poppet 21 in the position shown in the absence of an abnormal condition. The magnetic forces are provided by the permanent magnet 34 inset in the valve body 10, facing and attracting the opposite-poled permanent magnet 32 inset in the poppet portion 25. The magnet strength in chosen, together with the length of the gap 35, so that changes in ambient conditions up to some threshold valve will not cause the poppet to be permanently displaced from the position shown. However, as described, when the valve is vibrated, the vibration reaches a certain value, it will cause the ball to jump over the ridge 30. As has been noted, the poppet is slanted slightly toward the right. Once the ball 26 moves over the ridge, it will naturally roll downhill until it is trapped by the poppet portion 31, illustrated in FIG. 2. The valve is configured such that the added weight of the ball 26 is sufficient to overcome the magnetic forces, and the poppet rotates CW downward. Once, the magnets 32 and 34 are separated, there is noting to prevent the poppet 21 from continuing to rotate CW due to the weight of the ball 26 until it is stopped by the gasket 37 engaging the valve seat 20, shutting-off the flow through the valve. This position of the poppet, shown in FIG. 4, is also a stable position, which is maintained not only by the weight of the ball 26 but also by the pressure of the gas or other fluid at the inlet 11 which forces the poppet to its closed position. It is also preferred to provide additional magnet means to assist in holding the poppet in its closed position. The additional magnet means 40 are inset at the front wall (not shown in FIG. 4) and back wall of the valve body 10. As will be observed in the cross-sectional view of FIG. 6, in the closed poppet 21 position, the additional magnets 40 are positioned very close to the poppet and thus exert a very strong attractive force which ensures that even if the fluid flow 15 temporarily ceases, the poppet 21 will remain in its closed position shown in FIG. 4. It will also be noted that the curved poppet portion 31 substantially completely envelopes the ball 26 with a height exceeding the ball diameter and surpassing that of the ridge 30. Thus, it is unlikely that further vibrations of the valve will be capable of causing the ball 26 to be unseated from its position in the pocket formed by portion 31. As a matter of fact, as will be observed from FIG. 4, which is drawn approximately to scale, even if the ball 26 were thrown upward by vibration, it would eventually fall back into the position shown in FIG. 4.

A further feature of the invention, to ensure that the ball 26 remains in the position shown in FIGS. 2-4, is to extend the magnet 32 through the poppet wall so that it attracts and firmly holds the magnetic ball 26 as shown. Thus, magnet 32 performs a dual function.

In order to determine whether the valve is closed or open, a window 41 can be provided in the valve body 10 that would allow an observer to peer into the valve. Open and closed positions can be visible by painting the underside 42 of the poppet portion 31, say, white and painting the ball 26 black or another color. Thus, if the observer sees white, when the poppet is in the position of FIG. 1, the valve is open; if he or she sees black, when the poppet is in the position of FIG. 4, the valve is closed. The upper wall 44 is preferably removable as a cover held in place via screws or other fasteners indicated schematically at 45, suitably sealed off by a gasket 46. This allows the valve to be reset to its open position by simply removing the cover 44, and manually rotating the poppet CCW and repositioning the ball 26 to the position shown in FIG. 1.

Figure 5:
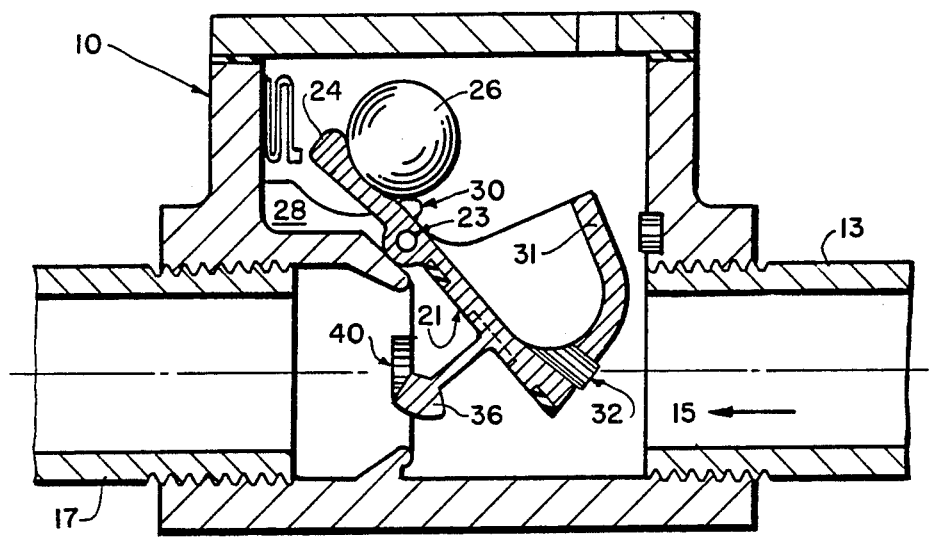
FIG. 5 is a view similar to FIG. 2 showing displacement of the poppet due to excessive fluid flow alone.

Also shown in FIGS. 1-4 is the vane 36 suspended from the bottom of the poppet 21 such that it lies in the main flow path 19 through the valve. The vane 36 can be given any shape desired to produce a certain drag force on the vane tending to cause the poppet 21 to break out of its first stable position. However, the drag force is adjusted or chosen that under normal flow conditions, the flow rate alone is not sufficient to close the valve. But, should the flow rate exceed some threshold value, then the drag force could be sufficient to cause the poppet 21 to rotate CW. As shown in FIG. 5, once this happens, the CW rotation will cause the ball 26 to be lifted by portion 24 to surmount ridge 30 causing it to roll to the right into the pocket formed by 31 ensuring positive shut-off of the valve.

While it is preferred that the valve body be constituted of metal, to avoid diversion of the magnetic field emanating from the magnets 32, 34, preferably a non-magnetic metal is chosen, such as brass, bronze or stainless steel. The same is true for the poppet 21. If desired, both members can be composed of a suitable plastic. In contrast, the sphere 26 is preferably composed of solid magnetic material, such as iron or steel, so it can be attached and held by the poppet magnet 32. One skilled in the art can readily choose magnets of suitable strength to achieve the desired operation of the valve of the invention. The length of the gap 35 between the magnets 32, 34 can also be adjusted to establish a desired poppet holding force, as for example, by adjustment of the position of the magnets in the body and poppet respectively. The shape of the vane 36 and the resultant drag force is another parameter that can be varied to control when the poppet 21 breaks away from its first stable position.

It is preferred to use a spherical ball 26 whose weight added to the right side 25 of the poppet 21 causes the poppet to be pivoted downward. This provides a more positive acting, reliable operation; plus the ball weight adds to the force by which the poppet is held in its closed position. That force between the seat 20 and the poppet gasket 37 affects the tightness of the resultant seal shutting-off fluid flow. In some fluid environments, a "soft seal" between metal and a rubber or similar gasket is adequate. In other applications, for other fluids, a "hard seal" is needed, using a metal gasket. The fluid pressure behind the closed poppet assists in maintaining the effectiveness of the seal.

Is is also possible to avoid using the ball 26 by an appropriate configuration and weight distribution of the poppet 21 alone. A typical earthquake would also cause vertical vibration of the poppet. If that vibration is sufficiently large is magnitude, the magnetic gap 35 can become so wide as to significantly reduce the attractive force between the magnets 32, 34 which, alone or together with the downward drag-force exerted by the vane 36, aided by gravity, will cause the poppet to break away from its first stable position, so that it enters the displaced intermediate non-stable position, and the poppet weight together with the fluid pressure on the vane and on the backside or topside of the poppet 31 will drive it into its third closed position, where it will be held by the inlet fluid pressure and the side holding magnets 40. The valve will not reset, i.e, be returned to the open position, of its own accord. It can only be reset manually via the access cover 44.

As mentioned, the status of the valve can be determined via the access window 41. As an alternative, advantage can be taken of the fact that the poppet magnet 32, when the poppet is in the closed position, is located adjacent the bottom wall 61 of valve body 10. A suitable magnetic-field responsive structure, as simple as a compass, can be mounted in the space underneath or adjacent magnet 32 and configured to change position when the magnet 32 arrives in its vicinity. This change in position can be viewed through a suitable window (not shown) provided in the bottom wall 61. As still a further alternative, the magnetic field responsive structure can be mounted if desired on bottom wall 61 external to the valve, and can still react to the field produced by the poppet magnet 32 penetrating through the non-magnetic valve wall.

It will be clear from the foregoing description that the valve of the invention will positively respond to the occurrence of an abnormal condition to shut-off the flow of a fluid passing through the valve. The operation is reliable and once the valve enters its closed position will maintain that closed position irrespective whether the abnormal condition continues or terminates. The valve is relatively simple in its operation and can be manufactured relatively inexpensively, and can easily be retrofitted to existing fluid pipes at low cost, or easily added to new constructions.

While the invention has been described in connection with several exemplary embodiments, other variations and modifications within the principles recited above will be readily appaarent to those skilled in this art and are intended to be included within the scope of my invention.

What is claimed is:

1. A safety valve for automatically shutting-off fluid flow in response to an abnormal condition, comprising:
    a valve body having an inlet for fluid at a first location and an outlet for fluid at a second location and defining a flow path for fluid within the body between the first and second locations,
    a valve seat within the fluid flow path from inlet to outlet,
    a valve poppet movably mounted within the body and movable from a first stable position which does not obstruct the flow path to a second position which is non-stable,
    means for maintaining the valve poppet in its first position, said first position maintaining means comprising a first magnet mounted on the poppet and a second magnet mounted on the body adjacent the first magnet to create with the first magnet a first attractive magnetic field which contributes to maintaining the valve poppet in its first position in the absence of the abnormal condition a ball shaped weight, said valve poppet construction being such that in response to the abnormal condition a sufficient force is produced to overcome the first attractive magnetic field causing the poppet to be displaced from its first position to its non-stable second position, and the ball-shaped weight is displaced to automatically drive the poppet to a third stable position where it contacts the valve seat and shuts-off the flow path, and
    a third magnet mounted on the body adjacent the valve seat to create a second attractive magnetic field which pulls the poppet into contact with and helps hold the poppet in contact with the valve seat to shut-off the flow path and maintain the flow path shut-off.

2. A valve as claimed in claim 1 wherein the abnormal condition is excessive fluid flow and a vane is mounted on the poppet and extending into the flow path and creating a drag force in response to the excessive fluid flow causing the poppet to be displaced from its first to its second position.

3. A valve as claimed in claim 1 wherein the abnormal condition is excessive vibration and the ball-shaped weight is provided in a first position on the poppet which is displaced by the vibration to a second different position on the poppet causing the latter to be displaced from its first to its second position.

4. A valve as claimed in claim 1 wherein the abnormal condition is excessive vibration and the poppet has a weight distribution such that it is displaced from its first to its second position upon occurrence of the excessive vibration.

5. A valve as claimed in claim 1 wherein the abnormal condition is excessive temperature and the ball-shaped weight is provided on the poppet and is displaced by the occurrence of the excessive temperature and causing the poppet to be displaced from its first to its second position.

6. A valve as claimed in claim 1 wherein the valve construction comprises a vane mounted on the poppet and extending into the fluid flow path, said vane being configured to produce on the poppet a drag force due to fluid flow tending to displace the poppet from its first to its second position.

7. A safety valve for automatically shutting-off fluid flow in response to excessive vibration, comprising:
    a valve body having an inlet for fluid at a first location and an outlet for fluid at a second location and defining a flow path for fluid within the body between the first and second locations,
    a valve seat within the fluid flow path from inlet to outlet,
    a valve poppet movably mounted within the body and movable from a first stable position which does not obstruct the flow path to a second position which is non-stable,
    means for pivotably supporting the poppet at an intermediate location,
    drive means associated with the poppet such that when the latter occupies the second non-stable position the drive means will automatically drive the poppet into a third stable position wherein the poppet contacts the valve seat and shuts-off the flow path said drive means comprising a weight provided in a first position on the poppet on one side of the pivotable support and which is displaced by the vibration to a second position on the poppet on the opposite side of the pivotable support, said weight in the first position in the absence of the excessive vibration maintaining the poppet in its first position, said poppet and its association with the drive means being such that in response to the excessive vibration a sufficient force is produced to displace the weight from its first position to its second position and cause the poppet to be displaced from its first position to its second position, whereupon the poppet is driven to its third position to shut-off fluid through the valve.

8. A valve as claimed in claim 7 wherein the weight is ball-shaped.

9. A safety valve for automatically shutting-off fluid flow in response to an abnormal condition, comprising:
    a valve body having an inlet for fluid at a first lower location and an outlet for fluid at a second lower location and defining a flow path for fluid within the body between the first and second location,
    a valve seat within the fluid flow path from inlet to outlet, a valve poppet pivotably mounted within the body above the flow path and pivotable from a first generally horizontal stable position which does not obstruct the flow path to a second position which is non-stable, said pivotable mounting being located at an intermediate position of the poppet producing a first poppet portion on one side of the pivot and a second poppet portion on the opposite pivot side, drive means associated with the poppet such that when the latter occupies the second non-stable position the drive means will automatically pivot the poppet into a third stable generally vertical position wherein the second poppet portion contacts the valve seat and shuts-off the flow path, non-mechanical means in the absence of the abnormal condition for maintaining the poppet in its first position, and means in response to the abnormal condition to produce a sufficient torque to pivot the poppet from its first position to its second position, whereupon the poppet is driven to its third position to shut-off fluid flow through the valve.

10. A valve as claimed in claim 9 wherein the first poppet portion contains a region to receive a weighted sphere, a weighted sphere is seated in said region when the poppet is in its first position, means are provided to maintain the sphere in said region in the absence of the abnormal condition but to displace the sphere to the second poppet portion on the occurrence of the abnormal condition, said second poppet portion being configured to receive and hold the sphere when it is displaced to the second poppet portion, the weight of the sphere causing the poppet to be displaced from its first position and driven to its third position.

11. A valve as claimed in claim 10 wherein the maintaining means for the sphere on the first poppet portion is a ridge, and the first poppet portion is located at a higher position than the second poppet portion so that the sphere when displaced over the ridge will roll into the second poppet portion.

12. A valve as claimed in claim 10 wherein the means for maintaining the poppet in its first position comprises a first magnet in the body and a second magnet in the second poppet portion producing an attractive magnetic field between the first and second magnets when the poppet is in its first position.

13. A valve as claimed in claim 12 wherein the sphere is magnetic, and the second magnet is located in a position so that it will attract and hold the sphere when it reaches the second poppet portion.

14. A valve as claimed in claim 13 wherein third magnet means is mounted on the body in a location to attract and urge the poppet against the seat when the poppet is in its third position.

15. A valve as claimed in claim 13 wherein a shaped body depends from the poppet and extends into the flow path to create a drag force tending to cause the poppet to pivot but insufficient to actually pivot the poppet in the absence of the abnormal condition.

16. A valve as claimed in claim 13 wherein a bi-metallic temperature-movable strip is mounted on the body such that a distal portion is coupled to the weighted sphere in a position to displace the sphere over the ridge when an abnormal temperature condition occurs.

17. A valve as claimed in claim 10 wherein said body comprises a removable panel through which the poppet can be accessed for re-setting the valve to its open position.

18. A valve as claimed in claim 17 further comprising means for indicating whether the valve is open or closed.

19. A valve as claimed in claim 18 wherein the indicating means comprises a window in the valve body.

* * * * *